United States Patent
Takeda

(10) Patent No.: US 10,421,224 B2
(45) Date of Patent: Sep. 24, 2019

(54) METHOD FOR PRODUCING MOLDED ARTICLES, INJECTION WELDING MATERIAL, AND MOLDED ARTICLE

(71) Applicant: KURARAY CO., LTD., Kurashiki-shi (JP)

(72) Inventor: Hideaki Takeda, Tainai (JP)

(73) Assignee: KURARAY CO., LTD., Kurashiki-shi (JP)

(*) Notice: Subject to any disclaimer, the term of this patent is extended or adjusted under 35 U.S.C. 154(b) by 209 days.

(21) Appl. No.: 15/022,390

(22) PCT Filed: Sep. 18, 2014

(86) PCT No.: PCT/JP2014/004803
§ 371 (c)(1),
(2) Date: Mar. 16, 2016

(87) PCT Pub. No.: WO2015/040863
PCT Pub. Date: Mar. 26, 2015

(65) Prior Publication Data
US 2016/0221238 A1 Aug. 4, 2016

(30) Foreign Application Priority Data
Sep. 18, 2013 (JP) ................................. 2013-193104

(51) Int. Cl.
*B29C 45/14* (2006.01)
*B29C 45/00* (2006.01)
(Continued)

(52) U.S. Cl.
CPC .... *B29C 45/14475* (2013.01); *B29C 45/0062* (2013.01); *C08G 69/265* (2013.01);
(Continued)

(58) Field of Classification Search
CPC ................................................. B29C 45/0062
(Continued)

(56) References Cited

U.S. PATENT DOCUMENTS 6,265,081 B1* 7/2001 Urabe ................. B29C 45/1657
425/543
2002/0143117 A1 10/2002 Nozaki et al.
(Continued)

FOREIGN PATENT DOCUMENTS

CN 101759851 A 6/2010
EP 1 041 109 A2 10/2000
(Continued)

OTHER PUBLICATIONS

Extended European Search Report dated Mar. 20, 2017 in Patent Application No. 14846570.1.
(Continued)

*Primary Examiner* — Matthew J Daniels
*Assistant Examiner* — Hana C Page
(74) *Attorney, Agent, or Firm* — Oblon, McClelland, Maier & Neustadt, L.L.P.

(57) ABSTRACT

The present invention provides a method for producing molded articles by joining primary molded parts by injection welding, by which a molded article composed of primary molded parts that are joined with high weld strength can be produced. The present invention relates to a method for producing molded articles including a welding step of injecting an injection welding material containing a polyamide around or between butt weld portions of primary molded parts disposed in face-to-face contact, so as to weld the primary molded parts together to form a molded article. The polyamide contains dicarboxylic acid units and diamine units. This polyamide further contains triamine units in an amount of 0.05 to 1 mol % with respect to the total dicarboxylic acid units.

13 Claims, 2 Drawing Sheets

(51) Int. Cl.
  *C08G 69/26* (2006.01)
  *C08K 7/14* (2006.01)
  *C08L 77/06* (2006.01)
  *B29K 77/00* (2006.01)
  *B29L 31/00* (2006.01)

(52) U.S. Cl.
  CPC ............... *C08K 7/14* (2013.01); *C08L 77/06* (2013.01); *B29C 2045/0063* (2013.01); *B29K 2077/00* (2013.01); *B29L 2031/749* (2013.01)

(58) Field of Classification Search
  USPC ........................................................ 264/263
  See application file for complete search history.

(56) References Cited

U.S. PATENT DOCUMENTS

| | | | |
|---|---|---|---|
| 2011/0014486 A1 | 1/2011 | Sakamoto et al. | |
| 2012/0099980 A1* | 4/2012 | Nishita | B29C 45/0062 415/200 |
| 2013/0018166 A1* | 1/2013 | Nakai | C08G 69/26 528/347 |

FOREIGN PATENT DOCUMENTS

| | | |
|---|---|---|
| EP | 2 554 566 A1 | 2/2013 |
| JP | 10-305454 A | 11/1998 |
| JP | 11-116799 A | 4/1999 |
| JP | 2000-61983 A | 2/2000 |
| JP | 2000-345031 A | 12/2000 |
| JP | 2002-30214 A | 1/2002 |
| JP | 2004-250562 A | 9/2004 |
| JP | 2007-92004 A | 4/2007 |
| JP | 2009-275215 A | 11/2009 |
| JP | 2010-229232 A | 10/2010 |
| JP | 2012-136621 A | 7/2012 |
| WO | WO 2009/119759 A1 | 10/2009 |

OTHER PUBLICATIONS

International Search Report dated Nov. 18, 2014, in PCT/JP2014/004803 filed Sep. 18, 2014.

* cited by examiner

METHOD FOR PRODUCING MOLDED ARTICLES, INJECTION WELDING MATERIAL, AND MOLDED ARTICLE

TECHNICAL FIELD

The present invention relates to a method for producing molded articles by joining primary molded parts by injection welding. The present invention also relates to an injection welding material used to join primary molded parts by injection welding and to a molded article obtained by joining primary molded parts by the injection welding material.

BACKGROUND ART

With an increasing need for lightweight automobiles to improve their fuel efficiency, resin components have replaced metal components. Resin components have various advantages such as high workability, low noise, and high plasticity in addition to light weight.

In order to further increase the advantage of plasticity, various techniques have been developed to produce various hollow components by joining primary molded parts by welding. Examples of such techniques include vibration welding, hot plate welding, ultrasonic welding, laser welding, and injection welding. In particular, injection welding has attracted attention because of its high productivity.

In order to increase the weld strength between the primary molded parts joined by injection welding, various polyamide-containing injection welding materials have been proposed. For example, Patent Literature 1 discloses that a polyamide composition containing an aromatic polyamide and an aliphatic polyamide mixed at a specific weight ratio can be used as an injection welding material. Patent Literature 2 discloses that a polyamide composition containing a polyamide, glass fiber, and a nigrosine compound can be used as an injection welding material. Patent Literature 3 discloses that a polyamide composition containing a crystalline polyamide having a specific terminal amino group concentration, an amorphous, partially aromatic copolyamide, and an inorganic filler can be used as an injection welding material. Patent Literature 4 discloses that a polyamide composition containing a polyamide having a specific terminal amino group concentration and a specific viscosity number and a fibrous reinforcing material can be used as an injection welding material. Patent Literature 5 discloses that a polyamide composition containing a specific copolyamide and an inorganic filler can be used as an injection welding material. However, when any of the injection welding materials described in these patent documents is used to weld primary molded parts, the weld strength between the primary molded parts needs to be further improved.

CITATION LIST

Patent Literature

Patent Literature 1: JP 11(1999)-116799 A
Patent Literature 2: JP 2000-061983 A
Patent Literature 3: JP 2002-030214 A
Patent Literature 4: JP 2007-92004 A
Patent Literature 5: JP 2012-136621 A

SUMMARY OF INVENTION

Technical Problem

It is an object of the present invention to provide a method for producing molded articles by joining primary molded parts by injection welding, by which a molded article composed of primary molded parts that are joined with high weld strength can be produced. It is another object of the present invention to provide an injection welding material that allows production of a molded article composed of primary molded parts that are joined with high weld strength by injection welding. It is still another object of the present invention to provide a molded article composed of primary molded parts that are joined with high weld strength.

Solution to Problem

The Present Invention Relates to:

[1] a method for producing molded articles, including a welding step of injecting an injection welding material containing a polyamide around or between butt weld portions of primary molded parts disposed in face-to-face contact, so as to weld the primary molded parts together to form a molded article, the polyamide containing dicarboxylic acid units and diamine units, wherein the polyamide further contains triamine units in an amount of 0.05 to 1 mol % with respect to the total dicarboxylic acid units;

[2] the method according to the above [1], wherein the injection welding material contains 0.001 to 1.5 parts by mass of phosphorus atoms with respect to 100 parts by mass of the polyamide;

[3] the method according to the above [1] or [2], wherein the polyamide has a terminal amino group concentration of 5 to 130 µmol/g;

[4] the method according to any one of the above [1] to [3], wherein the diamine units of the polyamide contain 50 to 100 mol % of linear and/or branched aliphatic diamine units having 4 to 18 carbon atoms;

[5] the method according to any one of the above [1] to [4], wherein the dicarboxylic acid units of the polyamide contain 50 to 100 mol % of aromatic dicarboxylic acid units and/or alicyclic dicarboxylic acid units;

[6] the method according to any one of the above [1] to [5], wherein the polyamide has a melting point of 250 to 340° C.;

[7] the method according to any one of the above [1] to [6], wherein the injection welding material further contains an inorganic filler;

[8] the method according to any one of the above [1] to [7], further including, prior to the welding step: performing injection molding using a pair of molds so as to obtain the primary molded parts; and moving one or both of the molds so as to dispose the primary molded parts in face-to-face contact;

[9] the method according to any one of the above [1] to [8], wherein the molded article is a hollow body;

[10] the method according to any one of the above [1] to [9], wherein the molded article is a component for an automotive engine cooling system;

[11] the method according to any one of the above [1] to [9], wherein the molded article is a component for an automotive engine intake system;

[12] the method according to any one of the above [1] to [9], wherein the molded article is a component for an automotive fuel system;

[13] an injection welding material containing a polyamide containing dicarboxylic acid units and diamine units, wherein the polyamide further contains triamine units in an amount of 0.05 to 1 mol % with respect to the total dicarboxylic acid units;

[14] the injection welding material according to the above [13], wherein the injection welding material contains 0.001 to 1.5 parts by mass of phosphorus atoms with respect to 100 parts by mass of the polyamide;

[15] the injection welding material according to the above [13] or [14], further containing an inorganic filler; and

[16] a molded article including primary molded parts that are joined together by the injection welding material according to any one of the above [13] to [15].

Advantageous Effects of Invention

The production method of the present invention provides a molded article composed of primary molded parts that are joined with high weld strength. The injection welding material of the present invention allows production of a molded article composed of primary molded parts that are joined with high weld strength. The molded article of the present invention is composed of primary molded parts that are joined with high weld strength.

DESCRIPTION OF EMBODIMENTS

Figure 1:
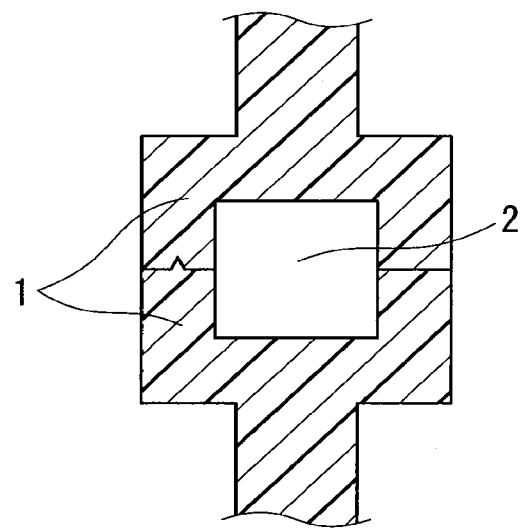
FIG. 1 is a cross-sectional view of an example of butt weld portions of primary molded parts.

The present invention is a method for producing molded articles, including a welding step of injecting an injection welding material containing a polyamide around or between butt weld portions of primary molded parts disposed in face-to-face contact, so as to weld the primary molded parts together to form a molded article. The polyamide contains dicarboxylic acid units and diamine units. This polyamide further contains triamine units in an amount of 0.05 to 1 mol % with respect to the total dicarboxylic acid units.

First, an injection welding material used in the welding step is described. The injection welding material contains a polyamide containing dicarboxylic acid units and diamine units. The polyamide containing dicarboxylic acid units and diamine units can be obtained by polycondensation of a diamine and a dicarboxylic acid as raw materials.

It is known that such a polyamide obtained by polycondensation of a diamine and a dicarboxylic acid usually exhibits lower weld strength when it is used for injection welding than a polyamide obtained from monomers other than a diamine and a dicarboxylic acid, such as a lactam and an aminocarboxylic acid, as raw materials. This is because more meltable resins are advantageous in injection welding in which the surfaces of primary resin molded parts are melted by the heat of the molten injection welding material to join them together. This means that a polyamide containing monomer materials other than a diamine and a dicarboxylic acid has lower crystallinity and is easier to melt, and therefore can exhibit higher weld strength when it is used for injection welding. On the other hand, the injection welding material used in the present invention contains a polyamide containing dicarboxylic acid units and diamine units, that is, a polyamide obtained by polycondensation of a diamine and a dicarboxylic acid, but it can exhibit high weld strength because the polyamide in the material further contains a specific amount of triamine units.

The monomer units of the polyamide may further contain lactam units and aminocarboxylic acid units as long as the effects of the present invention are not impaired. However, it is preferable to use a polyamide obtained by polycondensation of a diamine and a dicarboxylic acid because such a polyamide has heat resistance, chemical resistance, and weld strength in a well-balanced manner.

Examples of the diamine units of the polyamide include units derived from: aliphatic diamines such as 1,4-butanediamine, 1,5-pentanediamine, 1,6-hexanediamine, 2-methyl-1,5-pentanediamine, 1,7-heptanediamine, 1,8-octanediamine, 1,9-nonanediamine, 2-methyl-1,8-octanediamine, 1,10-decanediamine, 1,11-undecanediamine, 1,12-dodecanediamine, 1,13-tridecanediamine, 1,16-hexadecanediamine, 1,18-octadecanediamine, 2,2,4 (or 2,4,4)-trimethylhexanediamine, and 5-methyl-nonanediamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; and aromatic diamines such as metaxylylenediamine and paraxylylenediamine. The polyamide may contain, as the diamine units, any one of these units alone or two or more different types of units in combination.

In terms of heat resistance and chemical resistance, the diamine units of the polyamide preferably contain linear and/or branched aliphatic diamine units having 4 to 18 carbon atoms. In this case, the diamine units of the polyamide contain preferably 50 to 100 mol %, more preferably 60 to 100 mol % of linear and/or branched aliphatic diamine units having 4 to 18 carbon atoms with respect to the total diamine units of the polyamide.

In terms of chemical resistance, the linear and/or branched aliphatic diamine units having 4 to 18 carbon atoms are preferably at least one type of units selected from the group consisting of 1,4-butanediamine units, 1,5-pentanediamine units, 1,6-hexanediamine units, 2-methyl-1,5-pentanediamine units, 1,8-octanediamine units, 1,9-nonanediamine units, 2-methyl-1,8-octanediamine units, and 1,10-decanediamine units, and more preferably at least one type of units selected from the group consisting of 1,9-nonanediamine units, 2-methyl-1,8-octanediamine units, and 1,10-decanediamine units. In particular, in terms of higher chemical resistance, it is preferable that the diamine units contain both 1,9-nonanediamine units and 2-methyl-1,8-octanediamine units. The molar ratio between them (1,9-nonanediamine units:2-methyl-1,8-octanediamine units) is preferably 99:1 to 1:99, and more preferably 95:5 to 50:50.

Examples of the dicarboxylic acid units of the polyamide include units derived from aliphatic dicarboxylic acids such as oxalic acid, malonic acid, dimethylmalonic acid, succinic acid, glutaric acid, adipic acid, 2-methyladipic acid, pimelic acid, 2,2-dimethylglutaric acid, suberic acid, 3,3-diethylsuccinic acid, azelaic acid, sebacic acid, dodecanedioic acid, and dimer acid; alicyclic dicarboxylic acids such as 1,3-cyclohexanedicarboxylic acid and 1,4-cyclohexanedicarboxylic acid; and aromatic dicarboxylic acids such as terephthalic acid, isophthalic acid, phthalic acid, 1,4-naphthalenedicarboxylic acid, 2,6-naphthalenedicarboxylic acid, 2,7-naphthalenedicarboxylic acid, 1,4-phenylenedioxydiacetic acid, 1,3-phenylenedioxydiacetic acid, diphenic acid, 4,4'-oxydibenzoic acid, diphenylmethane-4,4'-dicarboxylic acid, diphenylsulfone-4,4'-dicarboxylic acid, and 4,4'-biphenyldicarboxylic acid. The polyamide may contain, as the dicarboxylic acid units, any one of these units alone or two or more different types of units in combination.

In terms of heat resistance, the dicarboxylic acid units of the polyamide preferably contain aromatic dicarboxylic acid units and/or alicyclic dicarboxylic acid units. In this case, the dicarboxylic acid units of the polyamide contain preferably 50 to 100 mol %, more preferably 60 to 100 mol % of aromatic dicarboxylic acid units and/or alicyclic dicarboxylic acid units with respect to the total dicarboxylic acid units of the polyamide.

Preferably, the aromatic dicarboxylic acid units are terephthalic acid units. Preferably, the alicyclic dicarboxylic acid units are 1,4-cyclohexanedicarboxylic acid units. The polyamide containing terephthalic acid units and/or 1,4-cyclohexanedicarboxylic acid units have particularly high heat resistance.

Examples of the polyamide contained in the injection welding material used in the present invention include polyhexamethylene adipamide (polyamide 6,6), polytetramethylene adipamide (polyamide 4,6), polyhexamethylene sebacamide (polyamide 6,10), polyhexamethylene dodecamide (polyamide 6,12), polydecamethylene sebacamide (polyamide 10,10), polytetramethylene terephthalamide (polyamide 4T), polyheptamethylene terephthalamide (polyamide 5T), polyhexamethylene terephthalamide (polyamide 6T), polyhexamethylene isophthalamide (polyamide 6I), poly(2-methylpentamethylene) terephthalamide (polyamide M5T), polyhexamethylene cyclohexylamide (polyamide 6C), poly(2-methylpentamethylene) cyclohexylamide (polyamide M5C), polymetaxylylene adipamide (polyamide MXD6), polymetaxylylene azelamide (polyamide MXD9), polymetaxylylene sebacamide (polyamide MXD 10), polyparaxylylene adipamide (polyamide PXD6), polyparaxylylene azelamide (polyamide PXD9), polyparaxylylene sebacamide (polyamide PXD10), polynonamethylene terephthalamide (polyamide 9T), poly(2-methyloctamethylene) terephthalamide (polyamide M8T), polynonamethylene cyclohexylamide (polyamide 9C), poly(2-methyloctamethylene) cyclohexylamide (polyamide M8C), polydecamethylene terephthalamide (polyamide 10T), polydecamethylene cyclohexylamide (polyamide 10C), polyundecamethylene terephthalamide (polyamide 11T), polydodecamethylene terephthalamide (polyamide 12T), mixtures of these, and copolymers containing two or more different types of diamine units and/or dicarboxylic acid units of these polyamides. In particular, at least one polyamide selected from the group consisting of polynonamethylene terephthalamide (polyamide 9T), poly(2-methylocatamethylene) terephthalamide (polyamide M8T), and polynonamethylene cyclohexylamide (polyamide 9C) is preferred.

In terms of weld strength, and in terms of chemical resistance, particularly in terms of resistance to a radiator fluid used as an automotive engine coolant, the lower limit of the concentration of terminal amino groups in the polyamide is preferably 5 µmol/g, more preferably 30 µmol/g, and even more preferably 40 µmol/g. The upper limit of the concentration of terminal amino groups in the polyamide is preferably 130 µmol/g, more preferably 100 µmol/g, and even more preferably 80 µmol/g to avoid an increase in the viscosity of the accumulated molten polyamide, possibly causing a decrease in the weld strength.

In terms of heat resistance and weld strength, the melting point of the polyamide is preferably 250 to 340° C., more preferably 260 to 330° C., and even more preferably 265 to 320° C.

Preferably, at least 10% of the terminal groups of the molecular chains of the polyamide are blocked with a terminal blocking agent. When the polyamide having a terminal blocking ratio of 10% or more is used, an increase in the viscosity of the accumulated molten polyamide is reduced and the resulting molded article has higher weld strength. The terminal blocking ratio is more preferably 20% or more, and even more preferably 30% or more.

Herein, the terminal blocking ratio of the polyamide can be determined from the following equation (1) by measuring the number of terminal carboxyl groups in the polyamide, the number of terminal amino groups in the polyamide, and the number of terminal groups blocked with the terminal blocking agent, respectively. The numbers of these terminal groups can be determined by $^1$H-NMR on the basis of the integral values of the characteristic signals corresponding respectively to these terminal groups. In the equation (1), X denotes the total number of terminal groups of the molecular chains of the polyamide (this total number is normally equal to twice the number of polyamide molecules), and Y denotes the total number of unblocked terminal carboxyl groups and unblocked terminal amino groups in the polyamide.

$$\text{Terminal blocking ratio (\%)} = [(X-Y)/X] \times 100 \quad (1)$$

The terminal blocking agent for blocking the terminals of the polyamide is not particularly limited as long as it is a monofunctional compound that is reactive with the terminal amino groups or the terminal carboxyl groups of the polyamide. A monocarboxylic acid or a monoamine is preferred in terms of reactivity and stability of blocked terminals, and a monocarboxylic acid is more preferred because of its ease of handling. In addition, acid anhydrides, monoisocyanates, mono-acid halides, monoesters, monoalcohols, etc. can also be used as the terminal blocking agent.

The monocarboxylic acid used as the terminal blocking agent is not particularly limited as long as it is reactive with an amino group. Examples of such a monocarboxylic acid include aliphatic monocarboxylic acids such as acetic acid, propionic acid, butanoic acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid, and phenylacetic acid; and mixtures of any of these. In particular, in terms of reactivity, stability of blocked terminals, cost, etc. acetic acid, propionic acid, butanoic acid, valeric acid, caproic acid, caprylic acid, lauric acid, tridecanoic acid, myristic acid, palmitic acid, stearic acid, and benzoic acid are preferred.

The monoamine used as the terminal blocking agent is not particularly limited as long as it is reactive with a carboxyl group. Examples of such an monoamine include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; and mixtures of any of these. In particular, in terms of reactivity, high boiling point, stability of blocked terminals, cost, etc., butylamine, hexylamine, octylamine, decylamine, stearylamine, cyclohexylamine, and aniline are preferred.

The polyamide used in the present invention contains triamine units. The lower limit of the content of triamine units needs to be 0.05 mol % with respect to 100 mol % of dicarboxylic acid units. The lower limit is preferably 0.1 mol %, and more preferably 0.2 mol %. The upper limit of the content of triamine units needs to be 1 mol %. The upper limit is preferably 0.8 mol %, and more preferably 0.5 mol %. The triamine units mentioned above are N,N-2-substituted amide units which are by-produced during production of the polyamide by polycondensation of a diamine and a dicarboxylic acid as the raw materials. When the content of triamine units in the polyamide is within the above-mentioned range, the thickening behavior of the accumulated molten polyamide can be suppressed. On the other hand, when the content of triamine units exceeds 1 mol %, the accumulated molten polyamide thickens in a molding machine and the fluidity of the resulting injection welding material decreases. Thus, the mold-filling ability of the injection welding material injected into a mold decreases. As a result, the weld strength decreases. The content of triamine units can be determined by $^1$H-NMR.

The content of triamine units can be easily set within the above range, for example, by introducing a specific amount of phosphorus atoms into the polyamide. The lower limit of the content of phosphorus atoms is preferably 0.001 parts by mass, and more preferably 0.01 parts by mass with respect to 100 parts by mass of the polyamide. The upper limit of the content of phosphorus atoms is preferably 1.5 parts by mass, more preferably 1 part by mass, even more preferably 0.5 parts by mass, and still even more preferably 0.08 parts by mass. When the content of phosphorus atoms is less than 0.001 parts by mass, the content of triamine units is likely to exceed 1 mol %. When the content of phosphorus atoms exceeds 1.5 parts by mass, the decomposition of the accumulated molten polyamide is accelerated and thus the weld strength tends to decrease.

The phosphorus atoms contained in the injection welding material are preferably derived from a catalyst for the synthesis of the polyamide (in particular, a phosphoric acid-, phosphorous acid-, or hypophosphorous acid-based catalyst).

The polyamide can be produced by any commonly known method in which a diamine and a dicarboxylic acid are used as raw materials. For example, the polyamide can be produced by solution polymerization or interfacial polymerization in which an acid chloride and a diamine are used as raw materials, or by melt polymerization, solid-phase polymerization, or melt extrusion polymerization in which a dicarboxylic acid and a diamine are used as raw materials.

The polyamide used in the present invention can be produced preferably, for example, by the following method. First, a dicarboxylic acid component, a diamine component, and a catalyst, and a terminal blocking agent as an optional component are mixed together to obtain a polyamide salt. Then, the polyamide salt is thermally polymerized at a temperature of 200 to 250° C. to obtain a prepolymer having an inherent viscosity ($\eta_{inh}$) of 0.1 to 0.6 dL/g, as measured for a sample with a concentration of 0.2 g/dL in concentrated sulfuric acid at 30° C. Finally, the prepolymer is further subjected to solid-phase polymerization or polymerization using a melt extruder. The inherent viscosity ($\eta_{inh}$) of the prepolymer in a range of 0.1 to 0.6 dL/g results in advantages such that in the subsequent polymerization process, an imbalance in the number of moles of carboxyl groups and amino groups and a decrease in the polymerization rate are reduced and thus the resulting polyamide has a narrower molecular weight distribution and has better physical properties and moldability. In the case of performing the final stage of polymerization by solid-phase polymerization, it is preferable to grind the prepolymer into particles of 2 mm or less prior to the solid-phase polymerization.

In the case of performing the final stage of polymerization by solid-phase polymerization, it is preferable to perform the polymerization under reduced pressure or in an inert gas atmosphere. If the polymerization is performed at a temperature ranging from 200 to 280° C., not only the polymerization rate is increased and thus the productivity is increased but also coloration and gelation can be effectively suppressed. In the case of performing the final stage of polymerization using a melt extruder, the polymerization temperature is preferably 370° C. or lower. When the polymerization is performed under these conditions, the resulting polyamide is hardly decomposed and thus is resistant to degradation.

The inherent viscosity ($\eta_{inh}$) of the polyamide, as measured for a sample with a concentration of 0.2 g/dL in concentrated sulfuric acid at 30° C., is preferably in a range of 0.4 to 3.0 dL/g, more preferably in a range of 0.5 to 2.0 dL/g, and even more preferably in a range of 0.6 to 1.8 dL/g. The polyamide having an inherent viscosity ($\eta_{inh}$) in the above range can provide a molded article having high heat resistance.

Examples of the catalyst used for the polymerization of the polyamide include phosphoric acid-, phosphorous acid-, or hypophosphorous acid-based catalysts such as phosphoric acid, phosphorous acid, hypophosphorous acid, and salts or esters thereof. Examples of the salts or esters mentioned above include salts of phosphoric acid, phosphorous acid, and hypophosphorous acid with metals such as potassium, sodium, magnesium, vanadium, calcium, zinc, cobalt, manganese, tin, tungsten, germanium, titanium, and antimony; ammonium salts of phosphoric acid, phosphorous acid, and hypophosphorous acid; and ethyl esters, isopropyl esters, butyl esters, hexyl esters, isodecyl esters, octadecyl esters, decyl esters, stearyl esters, and phenyl esters of phosphoric acid, phosphorous acid, and hypophosphorous acid.

In order to introduce a specific amount of triamine units into a polyamide for use in the injection welding material used in the present invention, the amount of this phosphoric acid-, phosphorous acid-, or hypophosphorous acid-based catalyst to be added is adjusted according to the type and amount of the raw materials of the polyamide (a dicarboxylic acid and a diamine, and a terminal blocking agent as needed). Specifically, according to the type and amount of the raw materials of the polyamide dicarboxylic acid and a diamine, and a terminal blocking agent as needed) and in terms of the theoretical amount of dehydration and yield in the synthesis of the polyamide, the amount of phosphorus atoms in the phosphoric acid-, phosphorous acid-, or hypophosphorous acid-based catalyst is adjusted to 0.001 to 1.5 parts by mass with respect to 100 parts by mass of the resulting polyamide.

The injection welding material used in the present invention may contain an inorganic filler. Examples of the inorganic filler include: fibrous fillers such as glass fiber, carbon fiber, boron fiber, and basalt fiber; acicular fillers such as potassium titanate whisker, aluminum borate whisker, calcium carbonate whisker, wollastonite, and xonotlite; powdery fillers such as talc, calcium carbonate, silica, silica alumina, alumina, titanium dioxide, and molybdenum disulfide; and flaky fillers such as hydrotalcite, flaky glass, mica, clay, montmorillonite, and kaolin. Any one of these inorganic fillers may be used alone or two or more different types of fillers may be used in combination. In particular, the inorganic filler is preferably at least one selected from the group consisting of glass fiber, carbon fiber, potassium titanate whisker, aluminum borate whisker, calcium carbonate whisker, wollastonite, xonotlite, talc, calcium carbonate, silica, flaky glass, mica, and kaolin, and more preferably glass fiber and/or carbon fiber because these fillers further enhance the mechanical properties, heat resistance, and dimensional properties of the joint formed of the injection welding material.

When a fibrous filler and/or an acicular filler is used as the inorganic filler, the average length thereof is preferably in a range of 1 µm to 20 mm, more preferably in a range of 5 µm to 10 mm, and even more preferably in a range of 10 µm to 5 mm in order to keep good moldability and enhance the mechanical properties and heat resistance of the joint formed of the injection welding material. The aspect ratio, which is the ratio of the average length of filler particles to the average longest dimension of cross sections perpendicular to the lengthwise direction of the filler particles, is preferably in a range of 3 to 2000, and more preferably in a range of 10 to 600.

When glass fiber or carbon fiber is used as the inorganic filler, it may have a modified cross-sectional shape. The cross section of a fiber is a section taken along a plane perpendicular to the longitudinal direction of the fiber. Examples of the modified cross-sectional shape include a cocoon shape (a combination of two circles), an elliptical shape, a semicircular shape, a polygonal shape, and a star shape.

The inorganic filler may be surface-treated to improve the adhesion to the polyamide and enhance the mechanical properties of the resulting injection welding material. Examples of the surface treatment agent for the surface treatment include coupling agents such as a silane coupling agent, a titanium coupling agent, and an aluminate coupling agent, and binders. Examples of the coupling agent suitable for the surface treatment include aminosilane, epoxysilane, methyltrimethoxysilane, methyltriethoxysilane, γ-glycidoxypropyltrimethoxysilane, vinyltriacetoxysilane, and vinyltrimethoxysilane. Examples of the binder suitable for the surface treatment include epoxy compounds, urethane compounds, carboxylic acid compounds, urethane/maleic acid modified compounds, and urethane/amine modified compounds. Any one or more of these surface treatment agents may be used either alone or in combination. In particular, a combined use of a coupling agent and a binder further improves the adhesion of the inorganic filler to the polyamide and thus enhances the mechanical properties of the resulting injection welding material. The mass loss of the surface-treated inorganic filler after heating at 625±20° C. for at least 10 minutes is preferably in a range of 0.01 to 8.0 mass %, and more preferably in a range of 0.1 to 5.0 mass % based on the total mass of the surface-treated inorganic filler.

If the amount of the inorganic filler used is too small, the mechanical strength of the joint formed of the injection welding material may not be high enough. On the other hand, the amount of the inorganic filler is too large, the fluidity of the material decreases and thus the weld strength tends to decrease. Therefore, to balance the reinforcing effect and the weld strength, etc., the content of the inorganic filler is preferably in a range of 20 to 150 parts by mass, and more preferably in a range of 30 to 100 parts by mass with respect to 100 parts by mass of the polyamide.

The injection welding material may contain other optional components such as a nucleating agent, a copper stabilizer, a hindered phenol antioxidant, a hindered amine antioxidant, a phosphorus-based antioxidant, a thio-based antioxidant, a colorant, a dye, a pigment, an ultraviolet absorber, a light stabilizer, an antistatic agent, an impact modifier, a plasticizer, a lubricant, a flame retardant, and a flame retardant aid, as needed, as long as the effects of the present invention are not impaired.

As the method for producing the injection welding material used in the present invention, any method can be used as long as the polyamide can be homogeneously mixed with other components, as needed. Melt-kneading is commonly used. A kneading machine such as a single-screw extruder, a twin-screw extruder, a kneader, or a Banbury mixer can be used for the melt-kneading. The melt-kneading conditions are not particularly limited. For example, the injection welding material of the present invention can be obtained by kneading the mixture at a temperature 30 to 50° C. higher than the melting point of the polyamide for 1 to 30 minutes.

Next, the primary molded parts are described. The material of the primary molded parts of the present invention is not particularly limited as long as the material is suitable for welding the primary molded parts using the injection welding material of the present invention. In terms of weld strength, the material of the primary molded parts preferably contains a polyamide, and more preferably contains the injection welding material used in the present invention. In terms of productivity, it is even more preferable that the material of the primary molded parts be the same as the injection welding material used in the present invention.

Figure 2:
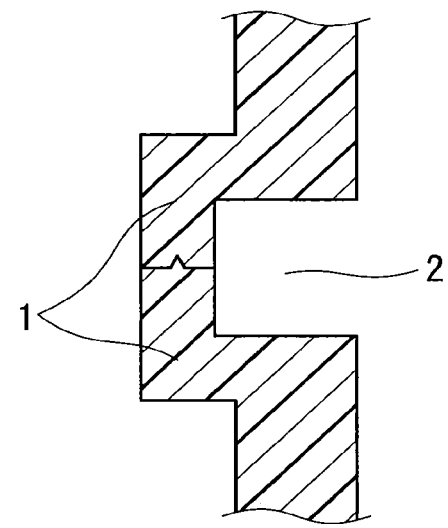
FIG. 2 is a cross-sectional view of another example of butt weld portions of primary molded parts.
Figure 3:
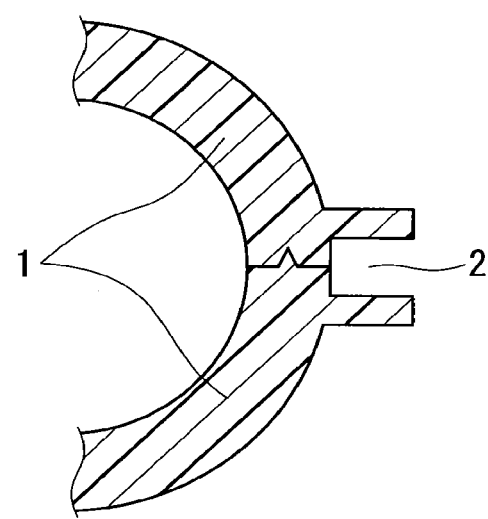
FIG. 3 is a cross-sectional view of still another example of butt weld portions of primary molded parts.

The shape of the primary molded parts is described. Preferably, the primary molded parts have such a shape as to form a channel of the injection welding material around or between the butt weld portions of the primary molded parts when they are disposed in face-to-face contact. FIGS. 1 to 3 show the cross sections of examples of the butt weld portions of the primary molded parts. In FIG. 1, the butt weld portions of the butting primary molded parts 1 form two opposite walls and thus form a hole serving as a channel 2 for the injection welding material between them. In FIG. 2, the butt weld portions of the butting primary molded parts 1 form a wall on their left side and thus form a groove serving as a channel 2 for the injection welding material between them. In FIG. 3, the butt weld portions of the butting primary molded parts 1 form a wall and thus form a groove serving as a channel 2 for the injection welding material between them.

FIGS. 1 to 3 show exemplary embodiments of the butt weld portions, and the butt weld portions are not limited to these embodiments. In FIGS. 1 and 2, the primary molded parts each may have a curved wall extending to the joint between the parts. In FIG. 3, the primary molded parts each may have a flat wall extending to the joint between the parts. The cross-sectional shape of the channel 2 is not limited to a rectangle, and it may be a shape other than a rectangle, for example, a polygon, a circle, or a semicircle. When the channel 2 for the injection welding material is formed between the butt weld portions of the primary molded parts as described above, the area of contact between the primary molded parts and the injection welding material is large enough to ensure higher weld strength. The shape of the primary molded parts, except for the shape of the butt weld portions, can be designed as appropriate depending on the intended application of the primary molded parts.

In the production method of the present invention, a preparation step of disposing the primary molded parts in face-to-face contact is performed before the welding step is performed. For example, this preparation step includes: performing (primary) injection molding using a mold other than a mold to be used in the welding step so as to obtain the primary molded parts; and transferring the primary molded parts thus obtained to the mold to be used in the welding step so as to dispose the primary molded parts in face-to-face contact. As another example, this preparation step includes: performing (primary) injection molding using a pair of molds so as to obtain the primary molded parts; and moving one or both of the molds so as to dispose the primary molded parts in face-to-face contact. The latter one is preferred as the preparation step.

A method of moving one or both of the molds is, for example, sliding of one or both of the molds or rotation of one or both of the molds. That is, the production method of the present invention including the preparation step can be performed by a technique, such as die slide injection (DSI) disclosed in JP 62(1987)-87315 A or die rotary injection (DRI) disclosed in JP 04(1992)-91914 A, by using the above-mentioned injection welding material.

In either preparation step, in order to obtain the primary molded parts by (primary) injection molding using a mold (or molds), the temperature of the material of the primary molded parts for primary injection is usually in a range from the melting point of the resin contained in this material to a temperature 100° C. higher than the melting point, preferably in a range from the melting point to a temperature 80° C. higher than the melting point. If the temperature of the material of the primary molded parts is excessively higher than the melting point, the resin in the material degrades, which may cause a decrease in the weld strength. The mold temperature is usually in a range from the glass transition temperature of the resin in the material of the primary molded parts to a temperature 80° C. higher than the glass transition temperature. If the mold temperature is excessively higher than the glass transition temperature, it is difficult to release the resin from the mold, which may cause deformation of the primary molded parts. If the mold temperature is lower than the glass transition temperature, crystallization of the resin in the material of the primary molded parts does not proceed sufficiently, which causes a decrease in the mechanical strength of the primary molded parts.

The welding step can be performed by injecting (i.e., secondarily injecting) the above-mentioned injection welding material around or between the butt weld portions of the primary molded parts disposed in face-to-face contact in a mold (for example, the injection welding material is injected into the channel 2 for the injection welding material shown in FIGS. 1 to 3).

The temperature of the injection welding material for secondary injection is usually in a range from the melting point of the polyamide in the injection welding material to a temperature 100° C. higher than the melting point, preferably in a range from the melting point to a temperature 80° C. higher than the melting point. If the temperature of the injection welding material is excessively higher than the melting point, the polyamide degrades, which may cause a decrease in the weld strength between the primary molded parts. The temperature of the injection welding material may be the same as the temperature of the material of the primary molded parts for primary injection, but if the temperature of the injection welding material is higher, the weld strength between the primary molded parts is further increased.

In the welding step described above, the thermal energy of the high-temperature injection welding material injected around or between the butt weld portions of the primary molded parts melts the surface of the primary molded parts, and thus the molten injection welding material and the molten surface of the primary molded parts are mixed and joined together. As a result, a molded article is obtained.

If the material of the primary molded parts is different from the injection welding material, the production method of the present invention performed by DSI or DRI requires the use of a molding machine having two cylinders. Therefore, the use of the same material for the primary molded parts and the injection welding material is advantageous in terms of production.

As described above, the use of the above-described injection welding material in the method for producing molded articles by joining primary molded parts by injection welding such as DSI or DRI makes it possible to obtain a molded article composed of the primary molded parts that are joined with high weld strength. The joint formed of the injection welding material has also high heat resistance and high chemical resistance. This injection welding material can be used to join primary molded parts made of a resin such as a polyamide having excellent properties.

Therefore, the molded article obtained by the production method of the present invention, i.e. the molded article composed of the primary molded parts that are joined together by the above-described injection welding material can be used in various applications such as automobiles, electrical/electronic devices, industrial materials, and everyday household goods, and is particularly suitable for use in automotive components.

The molded article of the present invention can be suitably used in automotive components, particularly in automotive engine components. Examples of such automotive engine components include: engine cooling system components used in contact with cooling water in an automobile engine room, such as radiator tank components, coolant reserve tanks, water pumps, water inlet pipes, water outlet pipes, water pump housings, and thermostat housings; engine intake system components such as air intake pipes and intake manifolds; and fuel system components such as fuel delivery pipes, fuel pump housings, valves, and fuel tanks. The molded article of the present invention is also suitable for use in automotive interior and exterior components and electrical/electronic components.

The molded article of the present invention can also be used in other applications. Examples of such applications include submarine oil pipes, offshore oil pipes, underground oil pipes, pipe liners, ocean cable gears, cams, insulating blocks, valves, electric power tool components, agricultural machine components, engine covers, and small fuel tanks for lawn mowers.

The present invention includes other embodiments achieved by combining the above-described features within the technical scope of the present invention as long as these other embodiments exhibit the effects of the present invention.

EXAMPLES

Hereinafter, the present invention will be described more specifically with reference to examples, but the present invention is not limited in any way by the following examples.

Measurement Methods

<Solution Viscosity>

The solution viscosity $\eta_{inh}$ of the polyamide was determined as follows. 50 mg of the polyamide was dissolved in 25 mL of 98% concentrated sulfuric acid in a measuring flask, and the dropping time (t) of the resulting solution at 30° C. was measured using an Ubbelohde viscometer. Then, the solution viscosity was calculated based on the dropping time ($t_o$) of concentrated sulfuric acid according to the following equation (2):

$$\eta_{inh}(dL/g) = \{ln(t/t_o)\}/0.2 \qquad (2)$$

<Content of Triamine Units>

A sample solution having a polyamide concentration of 5 mass % was prepared using HFIP-$d_2$ as a solvent. The sample was subjected to $^1$H-NMR spectroscopy at a measurement temperature of 50° C. using a nuclear magnetic resonance apparatus (Advance 600) manufactured by Bruker Instrument and 1024 scans were accumulated. Then, the content (mol %) of triamine units with respect to 100 mol % of the total dicarboxylic acid units was calculated from the peak around 7.5 ppm (corresponding to protons in the ortho position of a benzene ring adjacent to N,N-dialkylamide).

<Content of Phosphorus Atoms>

The injection welding material was subjected to dry ashing in the co-presence of sodium carbonate to convert phosphorus into orthophosphoric acid. Next, molybdate was reacted with orthophosphoric acid in a 1 mol/L sulfuric acid solution to obtain phosphomolybdic acid. The phosphomolyboclic acid was reduced by hydrazine sulfate to form a heteropoly blue complex, and then the absorbance thereof was measured at 830 nm with a spectrophotometer ("UV-150-02" manufactured by Shimadzu Corporation). Thus, the content (parts by mass) of phosphorus atoms in the polyamide was colorimetrically determined.

<Melting Point>

The melting point of each sample was determined as follows. In a differential scanning calorimeter (DSC822) manufactured by Mettler Toledo, a polyamide as a sample was heated in a nitrogen atmosphere at a rate of 10° C./min. from 30° C. to 340° C. and held for 2 minutes at 340° C. to completely melt the sample. Then, the sample was cooled at a rate of 10° C./min. to 30° C. and held for 2 minutes at 30° C. Then, the sample was heated again at a rate of 10° C./min. to 360° C., and the peak temperature of the melting peak appearing in this re-heating was determined as the melting point (° C.) and used as an index of heat resistance. In the case of the sample having two or more melting peaks, the highest one of the peak temperatures of the melting peaks was determined as its melting point (° C.).

<Chemical Resistance>

An ISO multipurpose specimen A of the injection welding material was prepared and its tensile strength was measured according to ISO 527. Another ISO multipurpose specimen A of the injection welding material was prepared and immersed in a 50% ethylene glycol aqueous solution for 500 hours at 130° C. Then, its tensile strength was measured according to ISO 527. The ratio (%) of the tensile strength of the specimen thus immersed to that of the specimen before the immersion was calculated, and the ratio was used as an index of chemical resistance.

<Weld Strength>

A molding machine (J220EII-P-2M, mold clamping force: 220 t, main unit screw diameter: 53 mm, sub unit screw diameter: 40 mm) manufactured by Japan Steel Works, Ltd. was used to produce, by die slide injection, a spherical hollow body with a diameter of 100 mm and a wall thickness of 3 mm having a through hole therein. A hose was connected to the through hole to subject the hollow body to a hydraulic test. The strength at break (MPa) of the welded joint of the hollow body was measured and used as an index of weld strength. The same polyamide resin composition was used for both a primary molding material and a welding resin (secondary molding material).

The raw materials used in Examples and Comparative Example are shown below.

<Preparation of Polyamide-1 (PA-1)>

9870.6 g (59.42 moles) of terephthalic acid, 9497.4 g (60.00 moles) of a mixture of 1,9-nonanediamine and 2-methyl-1,8-octanediamine [molar ratio of the former to the latter of 80:20], 142.9 g (1.17 moles) of benzoic acid, 19.5 g of sodium hypophosphite monohydrate (0.1 mass % with respect to the total mass of its raw materials), and 5 liters of distilled water were put into an autoclave with a net volume of 40 liters, and the resulting mixture was purged with nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was allowed to react while water vapor was removed gradually to maintain the pressure at 2 MPa. Next, the pressure was reduced to 1 MPa over 30 minutes, and the reaction was continued for another hour. Thus, a prepolymer having an inherent viscosity [$\eta_{inh}$] of 0.30 dL/g was obtained. The prepolymer was ground into a powder with a particle diameter of 2 mm or less using a flake crusher manufactured by Hosokawa Micron Corporation, and the powder was dried at 100° C. for 12 hours under reduced pressure. The dried powder was subjected to solid-phase polymerization at 230° C. and 13 Pa (0.1 mmHg) for 10 hours. Thus, a white polyamide having a melting point of 305° C., an inherent viscosity [$\eta_{inh}$] of 1.30 dL/g, a terminal amino group concentration ([$NH_2$]) of 9 μmol/g, and a terminal blocking ratio of 46% was obtained. The polyamide contained triamine units in an amount of 0.25 mol % with respect to 100 mol % of the total dicarboxylic acid units. The content of phosphorus atoms in this polyamide was 0.029 g with respect to 100 g of the polyamide. This polyamide is referred to as "PA-1".

<Preparation of Polyamide-2 (PA-2)>

9868.1 g (59.40 moles) of terephthalic acid, 9598.5 g (60.75 moles) of a mixture of 1,9-nonanediamine and 2-methyl-1,8-octanediamine [molar ratio of the former to the latter of 80:20], 146.5 g (1.20 moles) of benzoic acid, 19.7 g of sodium hypophosphite monohydrate (0.1 mass % with respect to the total mass of its raw materials), and 5 liters of distilled water were put into an autoclave with a net volume of 40 liters, and the resulting mixture was purged with nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was allowed to react while water vapor was removed gradually to maintain the pressure at 2 MPa. Next, the pressure was reduced to 1 MPa over 30 minutes, and the reaction was continued for another hour. Thus, a prepolymer having an inherent viscosity [$\eta_{inh}$] of 0.30 dL/g was obtained. The prepolymer was ground to a powder with a particle diameter of 2 mm or less using a flake crusher manufactured by Hosokawa Micron Corporation, and the powder was dried at 100° C. for 12 hours under reduced pressure. The dried powder was subjected to solid-phase polymerization at 230° C. and 13 Pa (0.1 mmHg) for 10 hours. Thus, a white polyamide having a melting point of 305° C., an inherent viscosity [$\eta_{inh}$] of 1.20 dL/g, a terminal amino group concentration ([$NH_2$]) of 44 μmol/g, and a terminal blocking ratio of 42% was obtained. The polyamide contained triamine units in an amount of 0.25 mol % with respect to 100 mol % of the total dicarboxylic acid units. The content of phosphorus atoms in this polyamide was 0.029 g with respect to 100 g of the polyamide. This polyamide is referred to as "PA-2".

<Preparation of Polyamide-3 (PA-3)>

A white polyamide having a melting point of 305° C., an inherent viscosity [$\eta_{inh}$] of 1.22 dL/g, a terminal amino group concentration ([$NH_2$]) of 80 μmol/g, and a terminal blocking ratio of 44% was obtained in the same manner as in the preparation of PA-2, except that 9734.8 g (61.50 moles) of a mixture of 1,9-nonanediamine and 2-methyl-1,8-octanediamine [molar ratio of the former to the latter of 80:20] was used. The polyamide contained triamine units in an amount of 0.25 mol % with respect to 100 mol % of the total dicarboxylic acid units. The content of phosphorus atoms in this polyamide was 0.029 g with respect to 100 g of the polyamide. This polyamide is referred to as "PA-3".

<Preparation of Polyamide-4 (PA-4)>

A white polyamide having a melting point of 265° C., an inherent viscosity [$\eta_{inh}$] of 1.19 dL/g, a terminal amino group concentration ([$NH_2$]) of 9 μmol/g, and a terminal blocking ratio of 38% was obtained in the same manner as in the preparation of PA-1, except that a mixture of 1,9-nonanediamine and 2-methyl-1,8-octanediamine with a molar ratio of 50:50 was used. The polyamide contained triamine units in an amount of 0.25 mol % with respect to 100 mol % of the total dicarboxylic acid units. The content of phosphorus atoms in this polyamide was 0.029 g with respect to 100 g of the polyamide. This polyamide is referred to as "PA-4".

<Preparation of Polyamide-5 (PA-5)>

A white polyamide having a melting point of 305° C., an inherent viscosity [$\eta_{inh}$] of 1.24 dL/g, a terminal amino group concentration ([$NH_2$]) of 11 μmol/g, and a terminal blocking ratio of 41% was obtained in the same manner as the preparation of PA-1, except that sodium hypophosphite was not used. The polyamide contained triamine units in an amount of 1.2 mol % with respect to 100 mol % of the total dicarboxylic acid units. The content of phosphorus atoms in this polyamide was 0 g with respect to 100 g of the polyamide. This polyamide is referred to as "PA-5".

<Preparation of Polyamide-6 (PA-6)>

A white polyamide having a melting point of 305° C., an inherent viscosity [$\eta_{inh}$] of 1.22 dL/g, a terminal amino group concentration ([$NH_2$]) of 13 μmol/g, and a terminal blocking ratio of 38% was obtained in the same manner as the preparation of PA-1, except that 1.35 g of sodium hypophosphite was used. The polyamide contained triamine units in an amount of 0.8 mol % with respect to 100 mol % of the total dicarboxylic acid units. The content of phosphorus atoms in this polyamide was 0.002 g with respect to 100 g of the polyamide. This polyamide is referred to as "PA-6".

<Preparation of Polyamide-7 (PA-7)>

A white polyamide having a melting point of 305° C., an inherent viscosity [$\eta_{inh}$] of 1.22 dL/g, a terminal amino group concentration ([$NH_2$]) of 121 μmol/g, and a terminal blocking ratio of 44% was obtained in the same manner as in the preparation of PA-2, except that 9811.8 g (62.10 moles) of a mixture of 1,9-nonanediamine and 2-methyl-1,8-octanediamine [molar ratio of the former to the latter of 80:20] was used. The polyamide contained triamine units in an amount of 0.25 mol % with respect to 100 mol % of the total dicarboxylic acid units. The content of phosphorus atoms in this polyamide was 0.029 g with respect to 100 g of the polyamide. This polyamide is referred to as "PA-7".

<Preparation of Polyamide-8 (PA-8)>

A white polyamide having a melting point of 305° C., an inherent viscosity [$\eta_{inh}$] of 1.21 dL/g, a terminal amino group concentration ([$NH_2$]) of 82 μmol/g, and a terminal blocking ratio of 38% was obtained in the same manner as in the preparation of PA-7, except that 78.8 g of sodium hypophosphite was used. The polyamide contained triamine units in an amount of 0.25 mol % with respect to 100 mol % of the total dicarboxylic acid units. The content of phosphorus atoms in this polyamide was 0.12 g with respect to 100 g of the polyamide. This polyamide is referred to as "PA-8".

<Preparation of Polyamide-9 (PA-9)>

A white polyamide having a melting point of 305° C., an inherent viscosity [$\eta_{inh}$] of 1.21 dL/g, a terminal amino group concentration ([$NH_2$]) of 10 μmol/g, and a terminal blocking ratio of 38% was obtained in the same manner as in the preparation of PA-1, except that 799 g of sodium hypophosphite was used. The polyamide contained triamine units in an amount of 0.25 mol % with respect to 100 mol % of the total dicarboxylic acid units. The content of phosphorus atoms in this polyamide was 1.2 g with respect to 100 g of the polyamide. This polyamide is referred to as "PA-9".

<Inorganic Filler>

Glass fiber: "CS-3J-256" (circular cross-sectional shape (aspect ratio of 1), diameter: 11 μm, fiber length: 3 mm) manufactured by Nitto Boseki Co., Ltd.

Examples 1 to 12 and Comparative Example 1

PA-1 to PA-9 were each fed into a co-rotating twin screw extruder ("TEM-26SS" manufactured by Toshiba Machine Co., Ltd.) all at once through its feed port, and melted and kneaded at a cylinder temperature 30° C. higher than the melting point of the polyamide. Then, the resulting mixture was extruded into strands, cooled, and cut into pellets. Thus, the injection welding material in the form of pellets were produced. In Examples where an inorganic filler was used, the filler was fed into the extruder through a feed port located downstream of the feed port for the polyamide so as to produce the injection welding material in the form of pellets. Using these pellets thus obtained, the chemical resistance and weld strength were evaluated by the methods described above. Table 1 shows the results.

TABLE 1

|  |  | Unit | Ex. 1 | Ex. 2 | Ex. 3 | Ex. 4 | Ex. 5 | Ex. 6 | Ex. 7 |
|---|---|---|---|---|---|---|---|---|---|
| Polyamide resins | PA-1 | parts by mass | 100 | — | — | — | 100 | — | — |
|  | PA-2 | parts by mass | — | 100 | — | — | — | 100 | — |
|  | PA-3 | parts by mass | — | — | 100 | — | — | — | 100 |
|  | PA-4 | parts by mass | — | — | — | 100 | — | — | — |
|  | PA-5 | parts by mass | — | — | — | — | — | — | — |
|  | PA-6 | parts by mass | — | — | — | — | — | — | — |
|  | PA-7 | parts by mass | — | — | — | — | — | — | — |

TABLE 1-continued

|  |  | Unit |  |  |  |  |  |  |  |
|---|---|---|---|---|---|---|---|---|---|
|  | PA-8 | parts by mass | — | — | — | — | — | — | — |
|  | PA-9 | parts by mass | — | — | — | — | — | — | — |
|  | Terminal amino group concentration | μmol/g | 9 | 44 | 80 | 9 | 9 | 44 | 80 |
|  | Triamine unit content | mol % | 0.25 | 0.25 | 0.25 | 0.25 | 0.25 | 0.25 | 0.25 |
|  | Phosphorus atom content | parts by mass | 0.029 | 0.029 | 0.029 | 0.029 | 0.029 | 0.029 | 0.029 |
| Inorganic filler (glass fiber) |  | parts by mass | — | — | — | — | 43 | 43 | 43 |
| Physical properties of material | Melting point | ° C. | 305 | 305 | 305 | 265 | 305 | 305 | 305 |
|  | Chemical resistance | % | 65 | 67 | 71 | 50 | 69 | 73 | 76 |
| Physical properties of molded article | Weld strength | MPa | 0.8 | 0.8 | 0.8 | 2.1 | 1.2 | 1.2 | 1.2 |

|  |  | Unit | Ex. 8 | Ex. 9 | Ex. 10 | Ex. 11 | Ex. 12 | Com. Ex. 1 |
|---|---|---|---|---|---|---|---|---|
| Polyamide resins | PA-1 | parts by mass | — | — | — | — | — | — |
|  | PA-2 | parts by mass | — | — | — | — | — | — |
|  | PA-3 | parts by mass | — | — | — | — | — | — |
|  | PA-4 | parts by mass | 100 | — | — | — | — | — |
|  | PA-5 | parts by mass | — | — | — | — | — | 100 |
|  | PA-6 | parts by mass | — | — | — | 100 | — | — |
|  | PA-7 | parts by mass | — | 100 | — | — | — | — |
|  | PA-8 | parts by mass | — | — | 100 | — | — | — |
|  | PA-9 | parts by mass | — | — | — | — | 100 | — |
|  | Terminal amino group concentration | μmol/g | 9 | 121 | 82 | 13 | 10 | 11 |
|  | Triamine unit content | mol % | 0.25 | 0.25 | 0.25 | 0.8 | 0.25 | 1.2 |
|  | Phosphorus atom content | parts by mass | 0.029 | 0.029 | 0.12 | 0.002 | 1.2 | 0 |
| Inorganic filler (glass fiber) |  | parts by mass | 43 | 43 | 43 | — | — | — |
| Physical properties of material | Melting point | ° C. | 265 | 305 | 305 | 305 | 305 | 305 |
|  | Chemical resistance | % | 62 | 77 | 75 | 65 | 63 | 66 |
| Physical properties of molded article | Weld strength | MPa | 2.5 | 1 | 1 | 0.5 | 0.5 | 0.3 |

The injection welding materials of Examples 1 to 12 containing triamine units in an amount of 0.05 to 1 mol % with respect to the total dicarboxylic acid units exhibited high weld strength. In contrast, the injection welding material of Comparative Example 1 containing triamine units in an amount of more than 1 mol % exhibited lower weld strength.

INDUSTRIAL APPLICABILITY

The present invention provides a molded article composed of primary molded parts that are joined with high weld strength. This molded article can be used in various applications such as automobiles, electrical/electronic devices, industrial materials, and everyday household goods, and is particularly suitable for use in automotive components.

DESCRIPTION OF REFERENCE NUMERALS

1 Primary molded part
2 Channel for injection welding material

The invention claimed is:
1. A method for producing molded articles, comprising welding by injecting an injection welding material comprising a polyamide around or between butt weld portions of primary molded parts together to form a molded article, the polyamide comprising dicarboxylic acid units and diamine units, wherein the polyamide further comprises triamine units in an amount of 0.05 to 1 mol % with respect to the total dicarboxylic acid units, wherein the triamine units are N,N-2 substitute amide units, and wherein the N,N-2 substitute amide units are by-produced by polycondensation of the diamine and dicarboxylic acid.

2. The method according to claim 1, wherein the injection welding material comprises 0.001 to 1.5 parts by mass of phosphorus atoms with respect to 100 parts by mass of the polyamide.

3. The method according to claim 1, wherein the polyamide has a terminal amino group concentration of 5 to 130 μmol/g.

4. The method according to claim 1, wherein the diamine units of the polyamide comprise 50 to 100 mol % of linear and/or branched aliphatic diamine units having 4 to 18 carbon atoms.

5. The method according to claim 1, wherein the dicarboxylic acid units of the polyamide comprise 50 to 100 mol % of aromatic dicarboxylic acid units and/or alicyclic dicarboxylic acid units.

6. The method according to claim 1, wherein the polyamide has a melting point of 250 to 340° C.

7. The method according to claim 1, wherein the injection welding material further comprises an inorganic filler.

8. The method according to claim 1, further comprising, prior to the welding:

performing injection molding using a pair of molds so as to obtain the primary molded parts; and moving one or both of the molds so as to dispose the primary molded parts in face-to-face contact.

9. The method according to claim 1, wherein the molded article is a hollow body.

10. The method according to claim 1, wherein the molded article is a component for an automotive engine cooling system.

11. The method according to claim 1, wherein the molded article is a component for an automotive engine intake system.

12. The method according to claim 1, wherein the molded article is a component for an automotive fuel system.

13. The method according to claim 2, wherein the polyamide has a terminal amino group concentration of 5 to 130 μmol/g.

* * * * *